Figure 1:
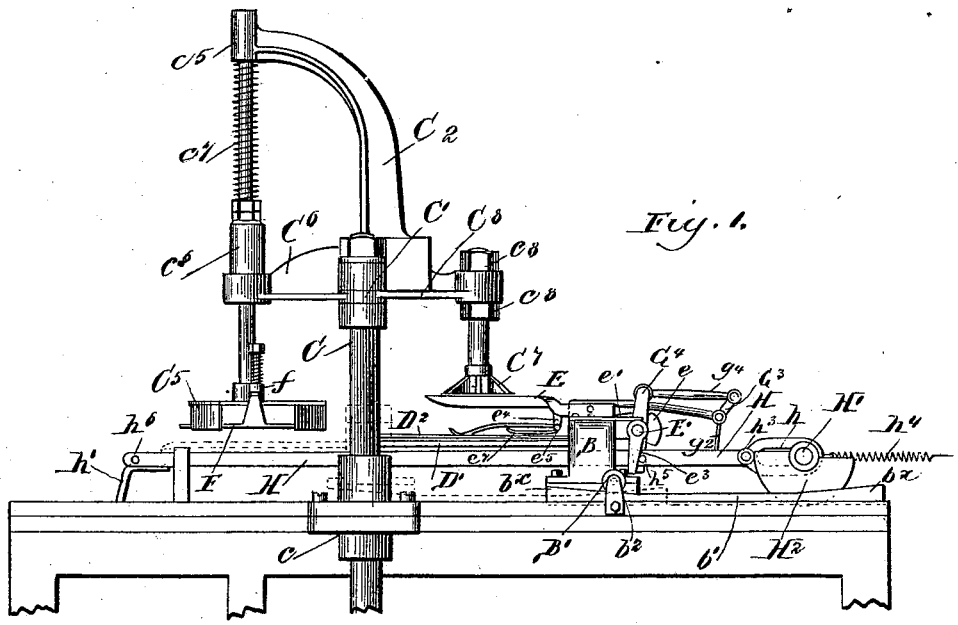

(No Model.) 6 Sheets—Sheet 1.

J. R. McDONALD.
ENVELOPE MACHINE.

No. 514,199. Patented Feb. 6, 1894.

Witnesses
W. Rossiter
A. L. Will

Inventor
James R. McDonald
By Joseph G. Parkinson
Atty.

(No Model.)  6 Sheets—Sheet 2.

J. R. McDONALD.
ENVELOPE MACHINE.

No. 514,199.  Patented Feb. 6, 1894.

Witnesses
W. Rossiter
A. D. Wells

Inventor
James R. McDonald
By Joseph G. Parkinson
Atty.

(No Model.) 6 Sheets—Sheet 3.
J. R. McDONALD.
ENVELOPE MACHINE.
No. 514,199. Patented Feb. 6, 1894.
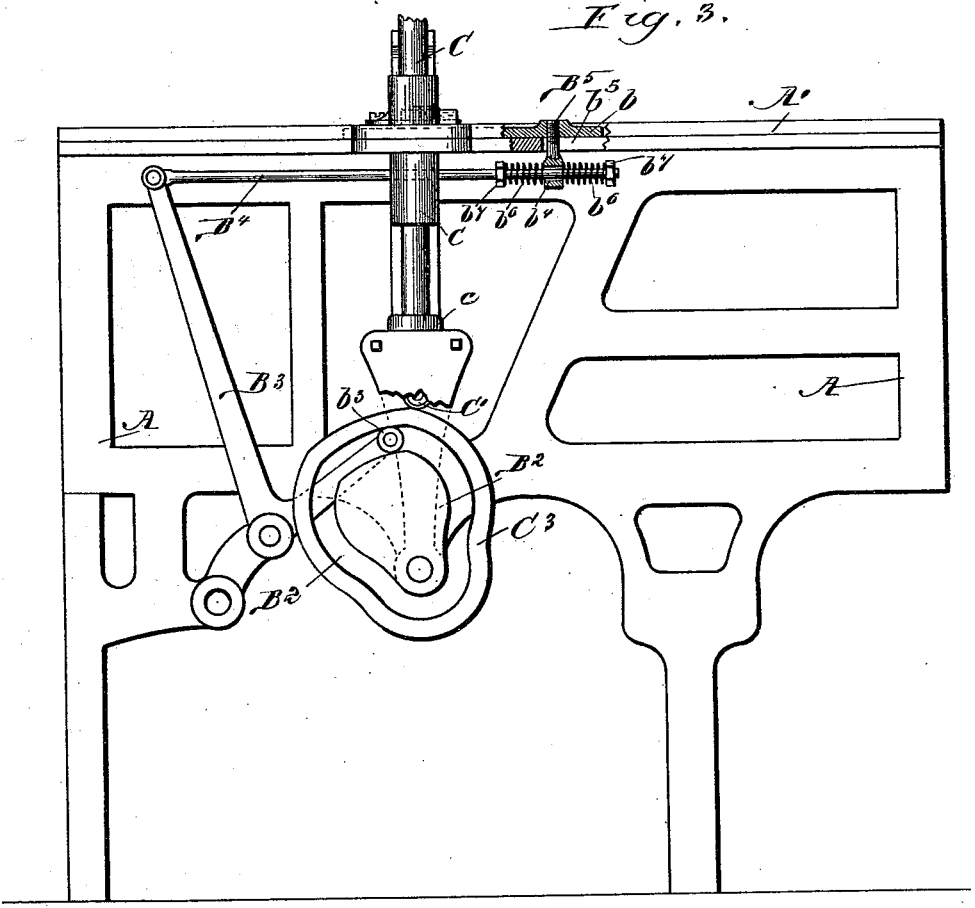
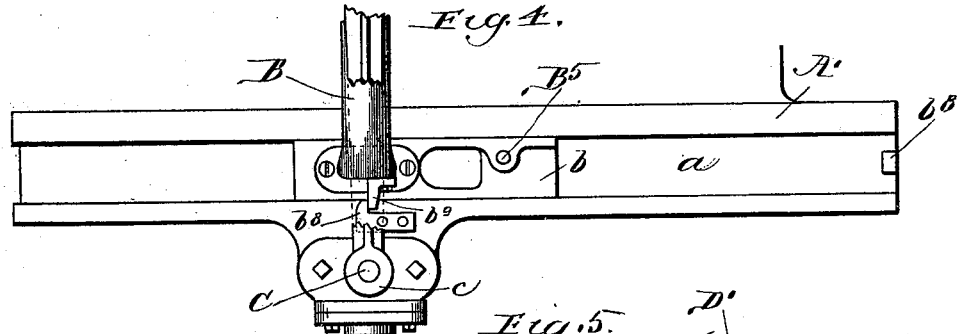
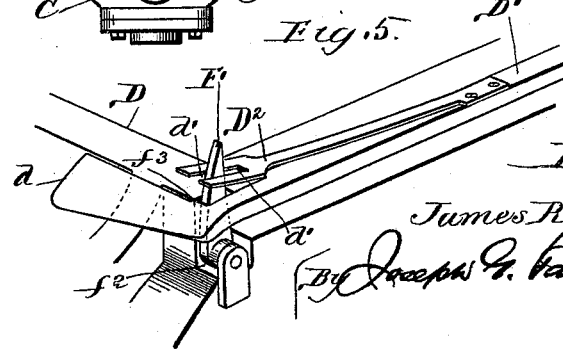
Witnesses
W. Roviller
A. S. Wells
Inventor
James R. McDonald,
By Joseph G. Parkinson
Atty.

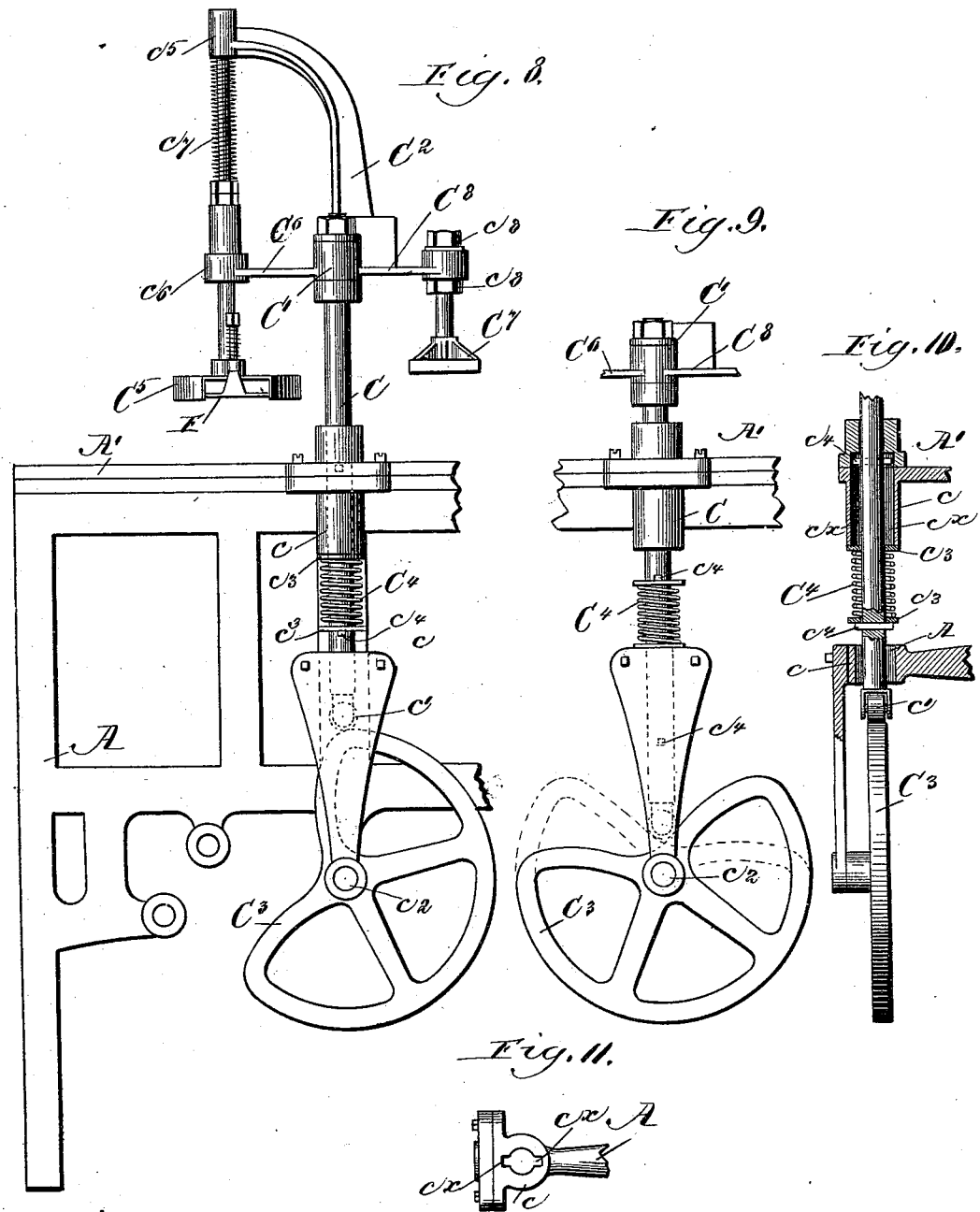

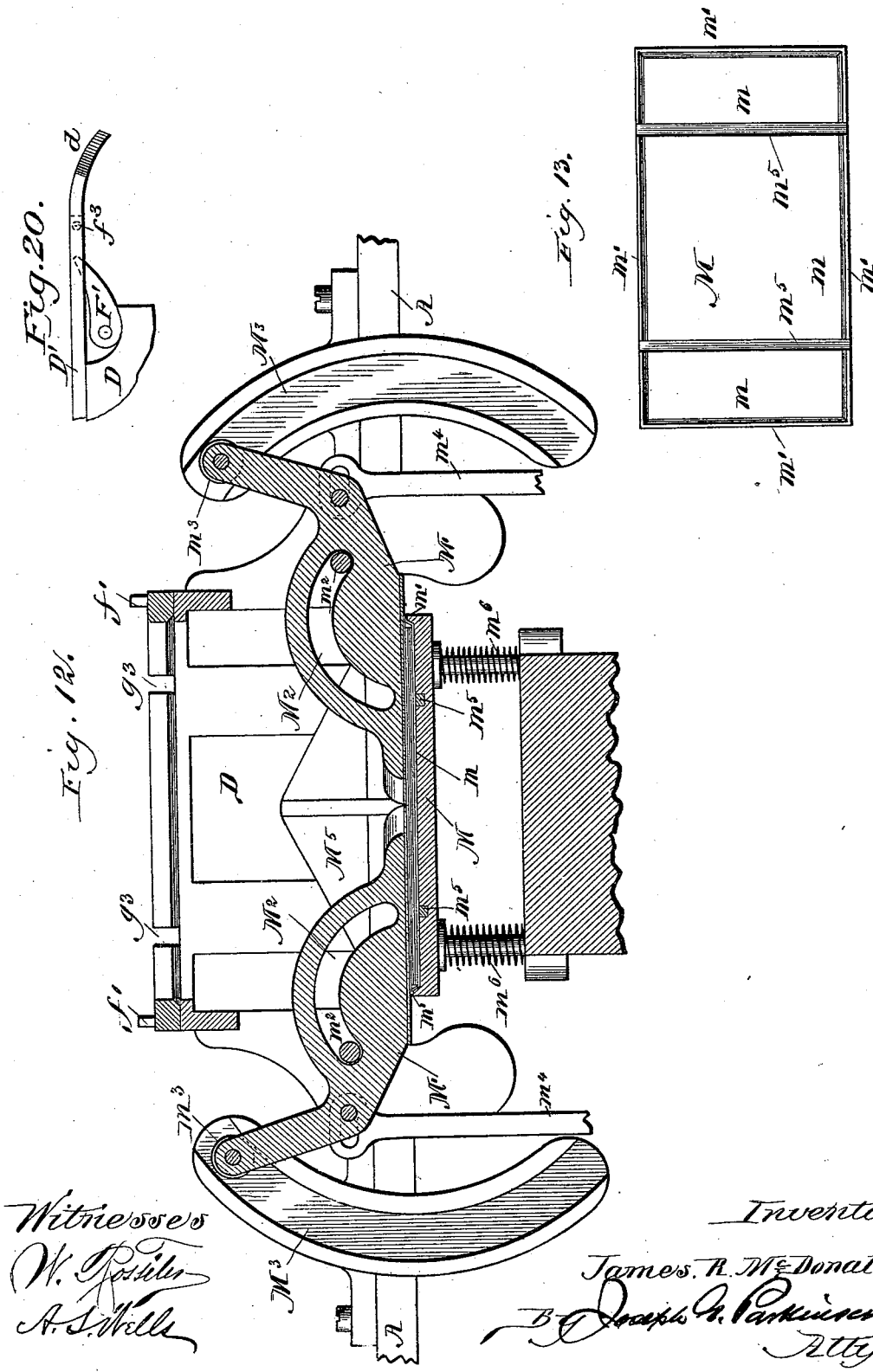

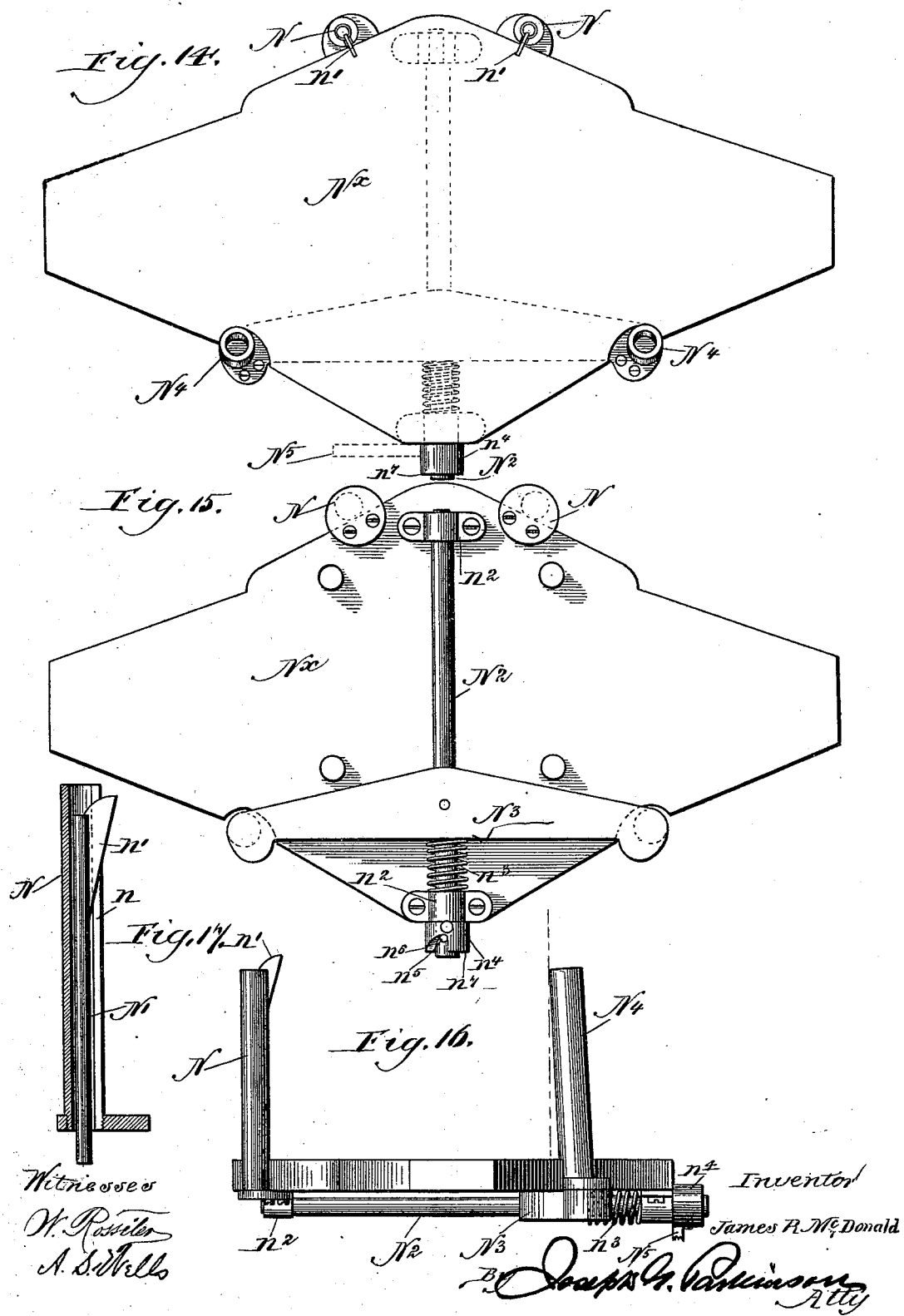

United States Patent Office.

JAMES R. McDONALD, OF CHICAGO, ILLINOIS, ASSIGNOR TO THE NATIONAL FOLDING AND ENVELOPING COMPANY, OF SAME PLACE.

ENVELOPE-MACHINE.

SPECIFICATION forming part of Letters Patent No. 514,199, dated February 6, 1894.

Application filed January 22, 1891. Serial No. 378,718. (No model.)

*To all whom it may concern:*

Be it known that I, JAMES R. MCDONALD, a citizen of the United States, residing at Chicago, in the county of Cook and State of Illinois, have invented certain new and useful Improvements in Envelope-Machines, of which the following is a specification.

Letters Patent of the United States have heretofore been granted to James R. McDonald and Timothy Stebbins under date of December 15, 1891, and numbered 464,984, for improvement in machines for making envelopes and placing inclosures therein, in which a previously prepared blank is taken up and gummed by a picker, carried to the folding-box by a reciprocating carriage, creased and forced to the bottom of said box by a plunger which leaves its flaps upstanding, folded mail-matter deposited therein by a suitable rake, and, finally, the flaps of the blank turned down and pressed upon such mail matter to complete the envelope and prepare it and its inclosure for the mail.

My present invention relates to improvements upon the machine made the subject of said Letters Patent as well also as to improvements upon envelope-machines generally, and it consists in the interposition of springs between the main-frame and the plunger frame operating as buffers in either direction but quiescent at certain stages of action, thereby obviating shock in both rise and fall of the plunger-frame but not adding labor in any marked degree; in a peculiar construction of the nippers for removing the gummed blank from the picker and carrying it to the folding-box; in a novel construction of the raking mechanism for carrying the folded mail-matter to the folding box to be delivered upon the creased envelope-blank; in means for preventing the tipping of such mail-matter as it enters the box; in recessing the bottom or bed of the folding-box to admit of thick or heavy material being deposited in the creased envelope-blank and the latter folded down smoothly thereover by the action of the plunger; in combining with stops for the reciprocating nipper carriage defining its limit of to and fro action, actuating mechanism which continues to urge said carriage forward after it has been brought to a standstill by the stop, and springs interposed between said mechanism and carriage to act alternately in the back and forth motion; in the employment of a novel wedging-brake or stop to gradually check the reciprocating movement of the nipper-carriage at each end of its traverse; in an improved construction of the table and its accessories for supporting the stack of blanks, and in the various combinations and details of construction hereinafter described.

Figure 7:
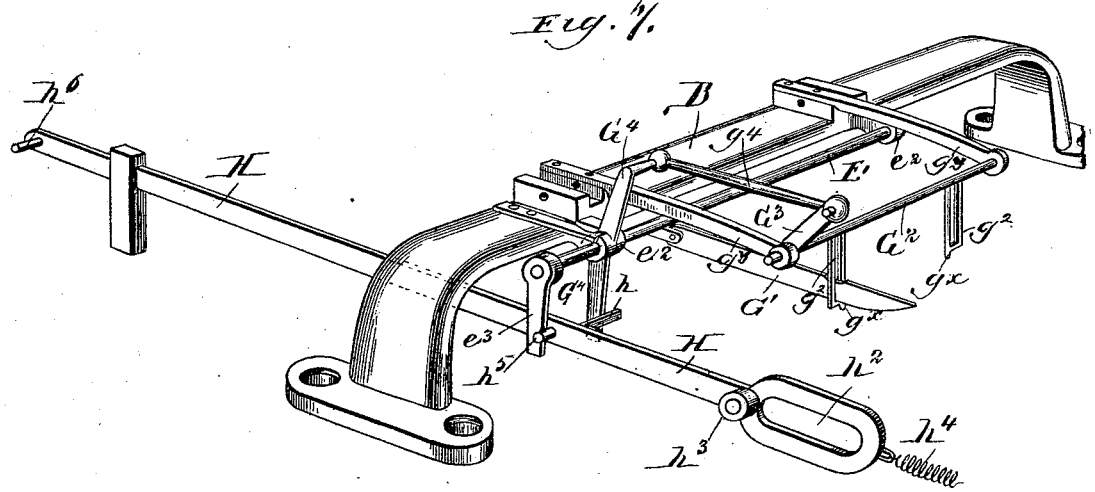
Figure 18:
Figure 2:
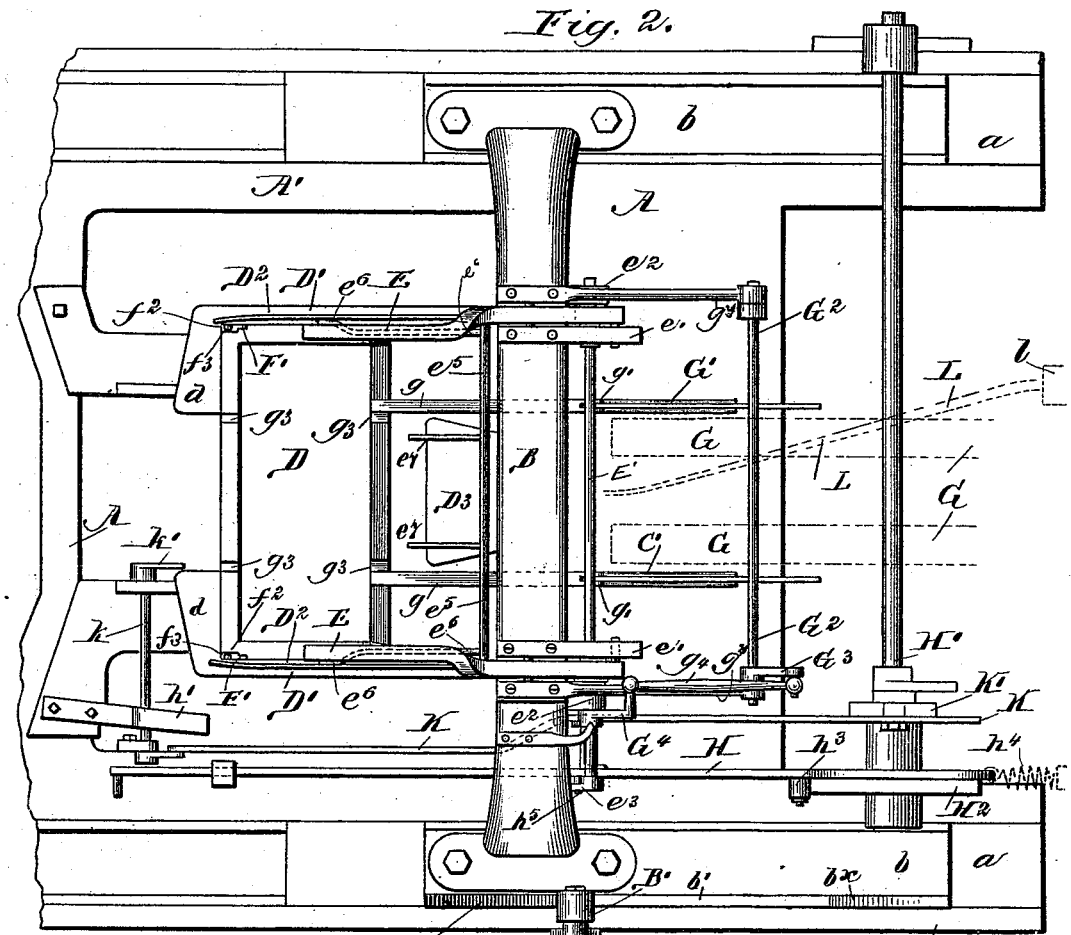
Figure 6:
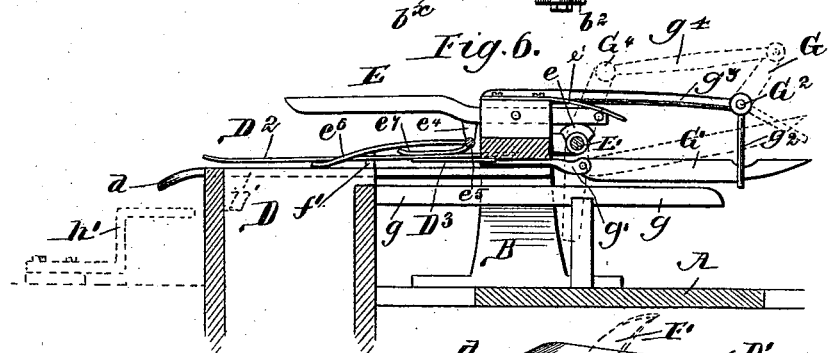
Figure 19:
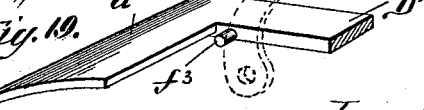

In the drawings: Figure 1 is a side elevation of so much of a machine constructed according to my invention as will suffice for a description of certain of the improvements. Fig. 2 is a top-plan view thereof. Fig. 3 is a side elevation partly broken away, and with the plunger-cam removed, to illustrate the mode of actuating the reciprocating nipper-carriage; Fig. 4, an enlarged detail in top-plan view of a part of said carriage with a runner and way, to elucidate the preceding figure; Fig. 5, an enlarged detail of a part of the folding box and nipper-carriage, showing one of the tucker-fingers which positions the blank for the action of the plunger; Fig. 6, an enlarged detail in vertical section, showing the upper part of the creasing and folding-box and also the nipper-carriage and rake. Fig. 7 is an enlarged detail of the bridge and the nipper-carriage, showing the rake and the trip-rod for operating it; Figs. 8, 9 and 10, enlarged details of the picker and plunger-frame, the cam for operating it, and the spring cushion, the latter of said figures being partly in vertical section; and Fig. 11 is an enlarged detail of one of the guide-sleeves for said frame; Fig. 12 an enlarged detail, in vertical section, of the folding box; and Fig. 13 a top plan view of the bed-plate or bottom of said box, this figure being intended to illustrate the recessing of said plate to accommodate heavy mail-matter; Fig. 14, a top-plan view, and Fig. 15, a bottom plan view, of the plate for supporting the stack of envelope-blanks; Fig. 16, a side elevation thereof; Fig. 17, a vertical section through one of the posts upon said plate; Fig. 18, an enlarged detail in perspective of the wedging-plate or stop for the reciprocating nipper-carriage, and Fig. 19, an enlarged detail to illustrate the manner in which the tucker-fingers are operated to place the envelope-blanks properly above the mouth of the folding-box; and Fig. 20, an enlarged detail of the parts in the foregoing figure showing the tucker-fingers open.

A represents a strong main-frame, advisably of metal, provided with bearings for the various shafts necessary to the complete action of the machine, and its upper lateral bars or cheeks, A', having planed ways, $a$, for the reception of the runners, $b$, of the reciprocating carriage, B, which carries on one side the nippers to grasp the blank and pass it over the folding-box, and on the other side the rake whereby the folded, printed or other mail-matter is swept into said folding-box after the blank has been creased by the descent of the plunger. In order to stop the carriage at each end of its reciprocation one or both of its runners may be provided with a vertical flange $b'$, of a little greater length than the traverse, at the ends rising slightly in wedge-shape at $b^x$, and over this flange may take a roller, B', supported upon a bracket, $b^2$, from the fixed frame, so that at each end of the traverse one of the wedges jams against the roller and acts as a brake or stop to check the carriage without shock. It is evident that two wedges rising from the shoe, one at each end of the traverse, without an intermediate connecting flange, will serve the same purpose. The reciprocation of the carriage may be effected by means of the pear-shaped cam, $B^2$, acting against the roller, $b^3$, on the end of the short arm of the elbow-lever, $B^3$, from the longer arm of which a link-rod, $B^4$, extends through an eye, $b^4$, in the pin, $B^5$, depending from one of the carriage runners and permitted play back and forth in the slot, $b^5$, through the floor of the way. At each side of the pin the link-rod receives coiled springs, $b^6$, the stress of which is adjustable by nuts, $b^7$, and the stroke is such, or the effective length of the link rod so adjusted by means of the nuts, that after the carriage is brought to a stand still by its stops the link continues to move a slight distance, thus compressing one or the other of the springs and holding the carriage steady against its stop. This actuating arrangement may obviously be used either with the wedging stops, or with abrupt shouldered stops, $b^8$, against which an offset, $b^9$, from the carriage strikes, as shown in the fourth figure of the drawings.

A plunger-frame supports the picker and plunger, as presently described. This consists of two vertical rods, C, at their upper ends connected by a strong cross-head, C', having a bracket, $C^2$, overhung toward the outer end of the machine, and sliding in guides, $c$, at each side of the main-frame, and at their lower ends provided with anti-friction rolls, $c'$, resting upon the periphery of the plunger-cams, $C^3$, one on each side of the machine, mounted upon a through-shaft, $c^2$, so as to simultaneously operate said rods. This plunger-frame, with its attachments, is necessarily of great weight and in the former construction already adverted to, its weight and inertia tended to cause a jumping action as it descended into the cut away portion of the actuating-cams, or was forced up therefrom. To obviate this I now place upon each of the vertically reciprocating side rods an elastic buffer, $C^4$, in such manner that while it shall be ineffective at certain stages of action, it shall be effective toward the limit of each upward or downward motion. To this end springs, $C^4$, are coiled about the vertical rods as shown and rest upon washers, $c^3$, at each end, these washers in turn are acted upon intermittently by pins, $c^4$, which pass through and project beyond the surface of the rods, one above the upper washer and the other below the lower washer. Both the upper and lower sleeve bearings or guides for the rods have channels or grooves, $c^x$, as shown in Figs. 10 and 11, to permit the passage of these pins, while the washers are checked alternately against the lower face of the upper bearing and the upper face of the lower bearing or guide. For instance,—referring to Fig. 8 and the vertical cross-section in Fig. 10,—as the plunger-frame is lifted by the cams, the upper washer lying in contact with the coiled spring comes against the lower face of the upper guide and is stopped, while the pin, until then in contact with its upper face, passes on into the guide and the pin beneath the lower washer is forced up thereagainst, compressing the spring and of course increasing its resistance to any jar or jumping movement. When on the other hand the plunger is descending, the lower washer strikes the upper face of the lower bearing or guide, while the upper washer is pressed down by the upper pin coming again in contact with it, as represented in the ninth figure, the lower pin meanwhile playing through the channel in said guide to any necessary position, as represented in dotted lines in said figure, the compression of the spring, therefore, in the descending movement, tending to lighten the frame and to prevent sudden shock or jar which might otherwise ensue from the falling of such a heavy body and its attachments into the cut away portion of the cam. As already suggested this frame supports the picker, $C^5$, to which end the overhung bracket is provided at its top with a guide-sleeve, $c^5$, another sleeve, $c^6$, being supported upon a horizontal arm, $C^6$, set out from the cross-head or some bearing or casting adjacent thereto. Through these guide-bearings runs a spring pressed rod, $c^7$, carrying at its lower end the picker, with the construction of which this present application has nothing to do. Opposite the picker is the plunger, $C^7$, supported by a horizontal offset, $C^8$, from the cross-head or adjacent bar, and adjustable by means of nuts, $c^8$, that keep it from play. Both picker and plunger will be actuated with the motion of the plunger-frame, the one to descend, gum and take up a fresh blank from the stack on the blank table while the other concurrently enters the folding-box, creasing the envelope-blank just previously deposited thereover and preparing it to receive mail-matter. As the plunger-frame is lifted, both picker and plunger rise, the one to lift a blank for delivery to the nippers and the other to open the folding-box that mail-matter may be deposited into the half formed envelope which it has just creased.

As the relative position of the blank-table and the folding-box to the picker and plunger will be well understood in the art they have not been represented in the drawings in connection with the latter, but so far as definite improvements have been introduced into them they will be found in separate detail views.

D is the folding-box, partly shown in Figs. 2 and 6, in its relation to the carriage when the latter is at the extreme of its rearward movement. Two rigid arms or bars, D', extend forward from the carriage, one on each side of the box, closely embracing it, and flush with its top along the sides, but at their ends reaching inwardly some distance toward each other, as at $d$, parallel with the front side of the box and flaring forward and downward from its upper edge. Above these arms or side-bars are two fixed spring-fingers, $D^2$, secured to the carriage, or to the bars themselves and lying close to and nearly parallel with the upper surface thereof, but slightly up-turned or flaring therefrom. These fingers may be either wire-spring as in Fig. 2, or plate-springs, as in Fig. 5, and, if the latter, will advisably have formed in their free ends re-entrant notches, $d'$, to receive the blank-tuckers, as presently explained. In the forward reciprocation of the carriage the lateral arms or side-bars move freely alongside of and past the folding-box and come underneath the envelope-blank which has been lifted by the picker, while the spring-fingers pass above the blank so that the side flaps of the blank are received and supported between said arms and spring-fingers. A plate or shelf, $D^3$, projecting centrally from the body of the carriage or from the bridge which forms such body and adapted to pass closely over the top of the folding-box in such forward movement, comes underneath the backflap so as to support it and keep it from catching against the folding-box in the rearward movement of the carriage to bring the blank beneath the plunger.

Stiff arms, E, which serve as depressing arms or fingers for the stripper by which the blank is removed from the picker, are pivoted to the reciprocating carriage, or nipper-carriage, as it may be termed, and at their heel-ends are acted upon by cams, $e$, to raise the heel-end and depress the forward end, being held in contact with such cams by means of springs, $e'$, which also serve to depress the heel-ends and lift the forward ends whenever the cams are turned to bring their cut away portions beneath such heel ends. These cams are mounted upon a rock-shaft, E', which turns in bearings, $e^2$, projecting from the rear of the carriage-bridge. An arm $e^3$ depending from this rock-shaft, which may hereinafter be termed the nipper rock-shaft, is acted upon at each end of the traverse of the carriage by tappets upon a trip-rod as will hereinafter appear, in such manner that at the rear limit of the traverse the raised portions of the cams will be carried around and down from beneath the heel-ends of the before mentioned depressing arms or fingers so that the forward ends will be immediately thrown up by the force of the springs. Lugs, $e^4$ depend from these arms just in front of the carriage-bridge and are connected by a rod, $e^5$, from the outer ends of which, adjacent to the side-bars and the spring-fingers extending over them project clamping or nipper-fingers, $e^6$, which may be elastically yielding, to practically one-half the width of the folding-box, these fingers being first bent downward until in their normal position laterally and finally slightly upward, as shown in Fig. 6, bringing their outer ends, when in the position indicated, somewhat below the plane of the stationary fingers or springs $D^2$ and over the side-bars. Other but shorter fingers, $e^7$, (one or more) project from the rod immediately over the plate or support for the backflap of the blank and are bent so as to come about parallel with that part and hold the flap down thereupon. Now as these fingers project from a bar that is rigid with and connects the two depressing arms or fingers, they will partake of its movement, being elevated when said bar is elevated and depressed when the bar is depressed. In the forward movement of the carriage the depressing fingers are raised, lifting with them the nipper-fingers. Upon reaching the picker the depressing fingers will pass on each side of lugs, $f$, rising from the stripper-plate, F, which is normally held somewhat above the gumming edges of the picker as shown in Fig. 1, when the nipper-fingers and fixed spring-fingers will pass above the side flaps of the blank held by the picker and the side-bars of the carriage will pass beneath the blank. At this moment the nipper-cam shaft is rocked to bring the raised peripheries of the cams against the heels of the depressing fingers, lifting said heels and bringing the forward ends down upon the stripper-lugs. The lateral nipper-fingers which have passed over each side-flap of the blank accompany this movement as also do the shorter or central nipper-fingers which have passed over the back-flap, and the blank, being stripped from the picker, by the conjoint action of the stripper and lateral nipper-fingers is clamped as it lies between the fixed spring-fingers and the side-bars and against the latter and the back-flap plate by the pressure of these two sets of nipper-fingers $e^6$, $e^7$ when the carriage starts on its rearward movement. This movement it will be understood terminates at the moment the blank is brought squarely over the folding-box. It sometimes happens however, that the blank is a little awry at that time and it therefore has been customary to place pins, $f'$, upon the rear of said box against which the back-flap is carried by vibrating-fingers rising from beneath the front of the box and pushing against the seal-flap until the blank is adjusted in proper register. This has usually been done by means of mechanism independent of the reciprocating carriage and operating after the nippers have been opened, but herein it is proposed to accomplish it by means of the side-bars themselves toward the termination of the rearward movement. To this end the front outside corners of the folding-box are cut away or recessed as at $f^2$, and fingers, F', are pivoted in said recesses, which fingers are allowed to fall away sufficiently to permit the passage of the envelope-blank above them, but are stopped in such position that their curved backs will be struck just before the termination of the rearward traverse, by pins or shoulders, $f^3$, projecting inward from the side bars, as best shown in the detail views, Figs. 5 and 19, and in the continued rearward movement of said side-bars will be lifted so as to push the side-flaps of the blank before them until the back flap has settled in between the stops at the rear of the box, which stops will be so arranged advisedly as to come between the angle of the back-flap and the side-flaps. Just prior to this moment the cams are caused to fall away from beneath the heels of the depressing-fingers so that the nipper-fingers carried by them will be raised, releasing the blank for the action of the tuckers which push it along between the side-bars of the carriage and the fixed spring-fingers until it is positioned against the rear stops. These fixed spring-fingers are of such length that when the tucker-fingers rise they will either shut past the ends of the wire springs, as in Fig. 2, or into the re-entrant notches in the ends of the plate springs, as in Fig. 5, thus completely cutting off the escape of the blank. As soon as the blank is tucked or pushed into register the plunger will descend and carry it into the folding-box, creasing it in such descent and at once rising, leaving the blank upon the bed of the box with its flaps upturned for the reception of the mail-matter intended to be deposited therein. The carriage then moves forward again to receive a fresh blank, and as it does so sweeps the folded mail matter into the receptacle, when the flaps of the blank are laid down and sealed upon the matter by appropriate mechanism.

The apparatus for sweeping or raking the mail-matter into the folding-box is arranged at the rear side of the carriage; that is, the receiving side for the mail matter or the side opposite to that on which the nippers work, and is as follows: Extending rearwardly from the mouth of the folding-box, partly shown in Figs. 2 and 6 and in enlarged detail in Figs. 12 and 13, to a point where they meet the conveyer or carrier-belts, G, which deliver mail matter to the enveloping-machine, is a series of slats, $g$, herein shown as two in number, constituting a flooring along which such mail matter is swept to the folding-box in the forward reciprocation of the carriage. Pivoted to ears, $g'$, extending rearwardly from the carriage immediately above each of these slats, are pressers or runners, G', which are intended to rest upon the folded matter and hold its flaps down as it is swept along the flooring-slats by the rake. They also, by their pressure upon the matter, continued until they pass entirely beyond the rear wall of the folding-box, prevent it from tipping over the edge thereof as soon as the weight of the part overhanging the mouth out-balances the weight of that part lying upon the flooring and thus being presented to the envelope-blank edgewise or in an oblique position, a fault heretofore met with. A rock-shaft, or rake-head $G^2$, having pendent slotted fingers, $g^2$, one to each of said pressers, is supported in arms overhung from the carriage bridge, above and slightly within the outer ends of the pressers. These fingers receive, support and guide the outer ends of the pressers in their respective slots, while permitting vertical play therein to accommodate varying thicknesses of mail matter or folded matter. When the fingers are held vertically, as shown in full lines in Fig. 6, they will sweep close to the upper surface of the flooring slats, and unless raised by an unusual thickness of mail-matter the under surface of the runners will be parallel with said upper surface of the slats. To make it impossible for any mail matter to slip through and be left, the fingers, which may be styled "rake-fingers," have each at one side of the slat a downwardly projecting lip, $g^\times$, which falls below said upper surface and which in the forward reciprocation of the carriage may pass through the slots, notches or mortises, $g^3$, in the top of the folding-box. When, however, the raking fingers are raised to the position shown in dotted lines in the above mentioned figure, as they will be in the rearward movement whereby fresh mail matter is received and a fresh blank deposited in the folding-box, the runners or pressers, which are preferably rounded upward at their free ends so as not to catch by any accident in the mail-matter delivered by the carrier, will be raised to the position likewise indicated. In order to control such movement of the fingers and to hold them pendent in the raking operation and inclined in the receiving operation, the rock-shaft from which they depend is provided with an arm, $G^3$, connected by link, $g^4$, with the upper arm of a rake lever, $G^4$, conveniently journaled upon the rock-shaft which operates the depressing and nipper-fingers, and hereinbefore styled the nipper-cam-shaft. The lower arm of this lever is at one end of the reciprocation stopped by a tappet, $h$, on the trip-rod, H, to carry the raking fingers down, as presently explained, to a vertical position and held in such position by the concurrent advance of the trip-rod in the forward reciprocation of the carriage, while at the other end it comes against a fixed stop, $h'$, on the frame, just before the forward movement of the carriage ceases, and is forced back relatively, rocking the rake-shaft and carrying the rake-fingers to their inclined, and the runners to their elevated, position, in which they remain until the termination of the rearward movement when they are again carried down, dropping the runners or presser upon the mail-matter delivered to the slatted flooring and the rake teeth behind such mail-matter, inclosing it so as to rake it forward in the next advance of the carriage.

In order that the mail matter may not be carried beyond the folding-box, and that it may be correctly guided therein, the front or outer side of the latter and the ends, are higher than the rear side, as shown in Fig. 6, so that said front side forms a stop, and the ends form guides, the flooring strips being of course flush with the rear side.

The trip-rod, H, is slotted at its rear end, as at $h^2$, to take over a shaft, H', and has in advance of this slot an anti-friction roll, $h^3$, against which the cam, $H^2$, moves to cause the advance of the rod while the retraction may conveniently be accomplished by a spring, $h^4$, as shown. On one side near its rear end the rod has the tappet, $h^5$, which strikes against the pendent arm from the nipper-cam-shaft or that shaft which actuates the depressing and nipper fingers, to open said fingers, and on the other side adjacent thereto the before mentioned tappet, $h$, which strikes the operating lever of the rock-shaft, $G^2$, and causes the closing of the rake-fingers as above stated. At its forward end it has another tappet, $h^6$, which in its sudden reverse movement, caused by the spring as its anti-friction roll passes off the raised periphery of its cam, strikes the pendent arm from the nipper-shaft reversely, throwing up the cams against the heels of the depressing-fingers to bring them and the nippers, respectively, down upon the stripper and against the envelope-blank.

Alongside of the trip-rod is shown a bent bar, K, which takes over a cam, K', upon the shaft that actuates the trip-rod and at the forward end moves a rock-shaft, $k$, the purpose of which is to actuate the finger, $k'$, that presses down the seal-flap for the more complete action of the seal-lapper, but as this forms no part of the present invention it is unnecessary to more specifically describe it.

Above the carrier is shown a presser-spring, L, suitably supported at $l$, which extends between the pivoted runners borne by the carriage and serves to hold the folded matter in contact with the carrier-belts with its flaps smoothed down, and to aid in properly delivering it to said runners.

It often happens that mail-matter of considerable thickness is deposited within the envelope-blank, as where a number of circulars are nested together, and if the receiving surface of the folding-bed, M, is perfectly plain and level the lappers are apt to jam down and crush the edges of the envelope and its contents. To obviate this difficulty the bed of the folding-box is recessed as at $m$, leaving raised edges, or a raised rib, $m'$, around its border, as represented in Figs. 12 and 13, in vertical section and top plan view respectively. In the first of said figures also, are shown in section the side flap lappers, M', guided by pins, $m^2$, taking into the curved slots, $M^2$, in their shanks, and by anti-friction rolls, $m^3$, at their heel ends traveling in curved guides, $M^3$, and actuated by rod, $m^4$, which may be moved by a cam. This figure also shows in face view the back-flap lapper, $M^5$, which, as well as the side lappers and seal flap-lapper, may be operated as in the former machine upon which this is an improvement. Ejector-fingers, $m^5$, lie in recesses in the bed, and are operated in any suitable manner after its descent, to discharge the envelope with its contents, and spring-pins, $m^6$, sustain the bed and allow it to yield beneath the plunger slightly if the matter received is extra heavy.

With this construction the envelope-blank will have its creased edges resting against the rib, which, as to its exterior, practically touches and fits within the walls of the folding-box, parts of which are formed by the lappers while they remain vertical, and the mail matter dropped therein will occupy the central depressed space. The lappers in their folding movement will strike the ribs first and will lay the flaps of the blank from that point. In practice they will fold and seal the envelope perfectly, whether an ordinary or extraordinary quantity of mail matter is deposited within the blank, as the resistance even of a light inclosure will be sufficient to bring the necessary pressure upon the flaps of the blank.

It is desirable to be able to introduce a stack of blanks quickly and accurately upon the blank-table $N^x$. Therefore I construct the latter with two posts, N, for the back flap, preferably hollow and vertically slotted on the inner side as at $n$, to receive weight spindles, N', which have at their upper ends outwardly and upwardly inclined or beveled spurs, $n'$, projecting through the slots, to insure the separation of but a single blank at a time by the action of the picker. These posts may be and preferably are arranged about half way between the apex of the back-flap and the respective angles formed by said flap with the two side flaps. Supported in bearings, $n^2$, beneath the table and advisably on the line from the apex of the seal flap to the apex of the back flap is a longitudinally sliding rod, $N^3$, upon which, at a point that brings it practically on a line connecting the angles formed by the seal-flap with the respective side-flaps, is secured a cross-head, $N^3$. A coiled spring, $n^3$, resting upon the bearing in which the rod plays beneath the seal flap, presses against this cross-head. From each end of the cross-head rise posts, N⁴, arranged to come into the angles between the side flaps and seal-flap. Mounted upon the rod exterior to the last mentioned bearing is a loose sleeve, $n^4$, having its outer edge cut away to form a cam edge, as shown in Fig. 15 and restrained from escape by means of a pin, $n^5$, against which this cam-edge plays. A lever, $N^5$, projects from the sleeve whereby it can be turned. Whenever the pin is in the cut away part, $n^6$, of the cam the sliding rod and the attached cross-head will be projected toward the table in the direction of the back flap by the force of the spring, bringing what may be called the seal-posts up against the stack of envelope-blanks, but whenever by the turning of the lever the pin is caused to ride out of the cut away part and upon the straight edge, $n^7$, the rod will be drawn toward the seal-flap, pulling the cross-head and seal posts away from the table and permitting a fresh stack of blanks to be introduced.

The seal-flap posts it is preferred to place in a slightly inclined position, as indicated in Fig. 16, so that the upper end of the posts will alone come in contact with the stack of envelope-blanks, and so that they may gradually feed in toward the back-flap posts or stops under the force of the spring as blank after blank is withdrawn. This insures a more perfect separation of the blanks, since the posts will tend to press always most strongly, although imperceptibly so, against the upper blank. This will, when the upwardly beveled spurs on weight-spindles are employed, involve a coaction between the two sets of posts on each side, the blanks being separated somewhat as a pack of cards may be separated with the thumb and fingers.

It is obvious that other forms of pressers or clips to prevent the mail matter from tipping over the edge of the envelope folding-box than the pivoted runners, may be employed; that such runners, when used, may be lifted by other means than the rake fingers, and that various modifications and alterations may be introduced into other parts of the machine, without departing from the spirit of the invention.

I claim as my invention—

1. The combination substantially as hereinbefore set forth, with the plunger-frame, the guides in which its supporting rods reciprocate and the cams which lift said rods, of double acting buffer-springs.

2. The combination substantially as hereinbefore set forth, with the plunger-frame and the longitudinally channeled guides in which its supporting rods play, of the springs coiled around said rods, the washers confining said springs and the pins confining the washers, said springs being arranged between upper and lower guides.

3. The combination substantially as hereinbefore set forth, with the plunger-frame, the supporting rods therefor, the longitudinally channeled guides in which said rods play, of the springs coiled around said rods, the washers confining said springs, the pins confining the washers and playing in the channels of the guides, and the cams for lifting the rods and plunger-frame.

4. The combination substantially as hereinbefore set forth, with the reciprocating nipper-carriage, of the inclines or ways corresponding with the limits of its reciprocation and the anti-friction roll against which said inclines or ways are alternately brought.

5. The combination substantially as hereinbefore set forth, with the reciprocating nipper-carriage, of the flanged shoe or runner having inclines or wedges at each end of the flange and the anti-friction roll secured to the frame and overhanging said flange to act against the inclines as a brake toward the termination of each back and forth reciprocation.

6. The combination substantially as hereinbefore set forth, with the reciprocating nipper-carriage, of the stops defining its limit of to-and-fro action, the link whereby said carriage is reciprocated, and springs interposed between said carriage and its actuating devices to act alternately in the back and forth motion, whereby the carriage is held in sure engagement with its stops at each end of the traverse.

7. The combination substantially as hereinbefore set forth, with the reciprocating nipper-carriage and its side-arms, of the fixed springs extending parallel with said side-arms and above them.

8. The combination substantially as hereinbefore set forth, with the reciprocating nipper-carriage and the plate carried thereby for the reception of the back flap of the envelope, of the nipper-finger or fingers arranged to be brought against said plate after it reaches and passes beneath said back-flap.

9. The combination substantially as hereinbefore set forth, with the reciprocating nipper-carriage and the forwardly extending plate carried thereby for the reception of the back-flap and with the side arms of said carriage, of the fixed spring fingers extending over said side arms to embrace the side-flaps of the envelope-blank and the nipper-finger or fingers playing against said plate to retain the back flap.

10. The combination substantially as hereinbefore set forth, with the reciprocating nipper-carriage and its side-arms and central forwardly extending plate, of the stationary springs extending over said side-arms to press on the upper side of the side-flaps, and the nipper fingers, their rock-shafts and means for actuating said rock-shafts.

11. The combination substantially as hereinbefore set forth, with the reciprocating nipper-carriage and its back-flap plate and forwardly extending side-bars, of the stationary springs lying over said side-bars, the nipper-finger or fingers pressing against the back-flap plate and the lateral nipper fingers adjacent to the stationary springs.

12. The combination substantially as hereinbefore set forth, with the reciprocating nipper-carriage and its back-flap plate and forwardly extending side-bars or arms, of pivoted depressing fingers and the central nipper-finger or fingers carried thereby to act upon the back flap plate, and means for vibrating said depressing-fingers.

13. The combination substantially as hereinbefore set forth, with the reciprocating nipper-carriage having a back flap plate and side bars or arms, of the stationary springs lying along side said bars, the central nipper-finger or fingers acting upon the back-flap-plate, the pivoted depressing-fingers supporting said nipper-finger or fingers, the cam operating the depressing fingers in one direction and the spring operating them in the other direction, the trip-rod and the plate whereby the cam-shaft is oscillated to open or close the cams.

14. The combination, substantially as hereinbefore set forth with the reciprocating nipper-carriage and with the folding box and devices for delivering mail matter to said box, of means for preventing the tipping of said mail matter as it is carried over the box and until it is in a position to be dropped therein.

15. The combination, substantially as hereinbefore set forth, with the reciprocating nipper carriage and with the folding-box and raking or conveying devices by which mail matter is delivered to said box, of means for holding said mail matter in a horizontal position until fully delivered over the mouth of the folding-box by the conveying devices.

16. The combination substantially as hereinbefore set forth, with the reciprocating nipper-carriage and with the flooring along which folded mail matter is carried, of the rearwardly extending pivoted presser bars or runners, the slotted rake-fingers supporting said bars and extending beneath them and means for opening and closing said rake-fingers whereby the presser-arms or runners are lifted or permitted to fall.

17. The combination substantially as hereinbefore set forth, with the reciprocating carriage and with the folding-box, of the rearwardly extending pivoted presser-runners, the vertically slotted rake-fingers supporting the rear ends of said runners and permitting them to play up and down, the crank-arm for their supporting rock-shaft or rake-head, the link connecting said arm with one end of a lever and means whereby said lever is vibrated to operate the fingers at each extreme of movement.

18. The combination substantially as hereinbefore set forth, with the reciprocating carriage and with the folding-box having appropriate notches in its upper edge, of the rearwardly extending receiving slats or slatted flooring and the rake-fingers projected below such slats and passing through said notches in the reciprocations of the carriage.

19. The combination substantially as hereinbefore set forth, with the reciprocating carriage and with the folding-box having slots in its upper edge, of the rearwardly extending flooring slats, the pivoted presser runners and means for throwing them up to receive folded matter, and lowering them to press thereon.

20. The combination substantially as hereinbefore set forth, with the reciprocating carriage and with the folding-box having slots in its upper edge, of the rearwardly extending flooring slats, the pivoted presser-runners, the vertically slotted rake-fingers supporting the rear ends of said runners and permitting them to play up and down in said slots.

21. The combination substantially as hereinbefore set forth, with the reciprocating carriage and with the folding-box having slots in its upper edge, of the rearwardly extending flooring slats, the pivoted presser-runners, the vertically slotted rake-fingers supporting the rear ends of said runners and permitting them to play up and down in said slots and the shouldered projections on said fingers engaging with the slats and projected beneath them so as to pass through the slots in the folding-box.

22. The combination substantially as hereinbefore set forth, with the reciprocating-carriage and with the folding-box, of the slatted flooring, the rearwardly extending hinged presser-runners overlying the slats of said flooring, the slotted rake fingers supporting them at their outer ends and formed with extension lugs to pass down alongside the slats of the flooring and means for swinging said fingers away from the slats to lift them and the presser runners and for returning them to position for sweeping the slats.

23. The combination substantially as hereinbefore set forth, with the rake-fingers and rake-head, of the crank-arm for said rake head, the lever with which said crank-arm is connected, the trip-bar provided with a tappet or lug arranged to act against the lower end of the lever to close the rake-fingers and the stationary stop on the frame whereby said fingers are opened.

24. The combination substantially as hereinbefore set forth, with the folding-box, the feed-belts or conveyers which deliver the folded mail-matter thereto and the intermediate conveying devices, of the spring whereby such matter is retained upon the belt.

25. The combination substantially as hereinbefore set forth, with the reciprocating carriage, the flooring over which it travels and the nipper cam-shaft mounted in said carriage, of the rake-lever pivoted upon the shaft, the rake-head journaled in arms from the carriage and having fingers, the lever-arm from said rake-head, and a link connecting said lever-arm with the rake-lever.

26. The combination substantially as hereinbefore set forth, with the folding-box, and plunger of the recessed bed-plate.

27. The combination substantially as hereinbefore set forth, with the side-bars or arms of the nipper-carriage and with the folding box and the retaining fingers over said side-bars, of the tucker-fingers arranged to move in past the ends of said arms.

28. The combination substantially as hereinbefore set forth, with the side-bars or arms of the nipper-carriage and with the folding-box and with the spring retaining fingers over said side-bars slotted at their ends, of the tucker-fingers, arranged to move in through said slots as they rise.

29. The combination substantially as hereinbefore set forth, with the nipper-carriage, of the folding-box and the pivoted tucker-fingers, of the side-bars of the nipper-carriage having pins or shoulders to actuate said tucker-fingers.

30. The combination substantially as hereinbefore set forth, with the blank-table and its back-posts, of the inwardly inclined front or seal posts.

31. The combination substantially as hereinbefore set forth, with the blank-table, of the back-posts having sliding bevels and the inwardly inclined front and seal posts.

32. The combination substantially as hereinbefore set forth, with the blank-table, of the back and seal posts and a sliding shaft whereby the seal-posts can be drawn away from the back-posts to insert a fresh charge and a spring urging said rod and seal posts toward the back posts.

33. The combination substantially as hereinbefore set forth, with the blank-table, of the back and seal posts, the cross-head uniting them, the sliding rod and its spring and the cam and its lever.

34. The combination substantially as hereinbefore set forth, with apparatus for conveying mail matter to the folding-box, of a stop at the front side of said box to prevent said matter passing beyond.

35. The combination substantially as hereinbefore set forth, with apparatus for conveying envelope-blanks to the folding-box, a plunger for creasing them therein, and apparatus for conveying folded mail matter to the box to deposit within said blank, of such box having its outer side elevated above the inner to act as a stop to such mail matter.

36. The combination substantially as hereinbefore set forth, with apparatus for conveying envelope-blanks to the folding-box, a plunger for creasing them therein, and apparatus for conveying folded mail-matter to the box to deposit within said blank, of such box having its outer side and its ends elevated above the inner whereby said outer side acts as a stop to such mail matter and the ends act as guides thereto.

JAMES R. McDONALD.

Witnesses:
A. S. WELLS,
M. E. SHIELDS.